US011264616B2

(12) United States Patent
Nagai et al.

(10) Patent No.: US 11,264,616 B2
(45) Date of Patent: Mar. 1, 2022

(54) CONDUCTIVE COMPOSITION FOR ELECTRODES, AND ELECTRODE AND BATTERY USING SAME

(71) Applicant: DENKA COMPANY LIMITED, Tokyo (JP)

(72) Inventors: Tatsuya Nagai, Tokyo (JP); Yoko Horikoshi, Tokyo (JP); Hitoshi Kaneko, Tokyo (JP); Hiroshi Yokota, Tokyo (JP)

(73) Assignee: Denka Company Limited, Tokyo (JP)

( * ) Notice: Subject to any disclaimer, the term of this patent is extended or adjusted under 35 U.S.C. 154(b) by 390 days.

(21) Appl. No.: 16/330,657

(22) PCT Filed: Jul. 3, 2017

(86) PCT No.: PCT/JP2017/024408
§ 371 (c)(1),
(2) Date: Mar. 5, 2019

(87) PCT Pub. No.: WO2018/047454
PCT Pub. Date: Mar. 15, 2018

(65) Prior Publication Data
US 2019/0198879 A1    Jun. 27, 2019

(30) Foreign Application Priority Data
Sep. 7, 2016  (JP) .............................. JP2016-174800

(51) Int. Cl.
*C01B 32/158* (2017.01)
*H01M 4/62* (2006.01)
(Continued)

(52) U.S. Cl.
CPC .............. *H01M 4/625* (2013.01); *B82B 1/00* (2013.01); *C01B 32/158* (2017.08); *H01M 4/13* (2013.01);
(Continued)

(58) Field of Classification Search
None
See application file for complete search history.

(56) References Cited

U.S. PATENT DOCUMENTS

| 2011/0003151 A1 | 1/2011 | Nishio et al. |
| 2012/0171566 A1 | 7/2012 | Yoshitake et al. |

(Continued)

FOREIGN PATENT DOCUMENTS

| CN | 103003983 A | 3/2013 |
| CN | 103392252 A | 11/2013 |

(Continued)

OTHER PUBLICATIONS

Machine Translation for WO 2016084697 A1 (2016).
(Continued)

*Primary Examiner* — Yoshitoshi Takeuchi
(74) *Attorney, Agent, or Firm* — Caesar Rivise, PC

(57) ABSTRACT

Provided is a conductive composition for electrodes, the conductive composition having excellent electrical conductivity and dispersibility. Also provided are: a positive electrode for non-aqueous batteries, the positive electrode using the conductive composition and having low electrode plate resistance and excellent binding properties; and a non-aqueous battery having high energy density, high output characteristics, and high cycle characteristics. The conductive composition for electrodes contains a conductive material, an active material, a binder, and a dispersant, wherein the conductive material contains carbon black and a multi-walled carbon nanotube having a powder resistivity of 0.035 Ω·cm or less as measured under a load of 9.8 MPa, and a median volumetric diameter D50 value, which is as a measure of dispersibility, in the range of 0.3-8 μm The positive electrode which is for non-aqueous batteries and has low electrode plate resistance and excellent binding properties; and the non-aqueous battery having high output
(Continued)

characteristics and high cycle characteristics are obtained by using the conductive composition in which the content of the multi-walled carbon nanotube in the conductive material is 3-50 mass %.

10 Claims, 2 Drawing Sheets

(51) Int. Cl.

| | | |
|---|---|---|
| *H01M 4/66* | (2006.01) | |
| *H01M 4/136* | (2010.01) | |
| *H01M 4/13* | (2010.01) | |
| *H01M 4/505* | (2010.01) | |
| *H01M 4/131* | (2010.01) | |
| *H01M 4/58* | (2010.01) | |
| *H01M 4/525* | (2010.01) | |
| *B82B 1/00* | (2006.01) | |
| *H01M 4/02* | (2006.01) | |

(52) U.S. Cl.
CPC .......... *H01M 4/131* (2013.01); *H01M 4/136* (2013.01); *H01M 4/505* (2013.01); *H01M 4/525* (2013.01); *H01M 4/58* (2013.01); *H01M 4/62* (2013.01); *H01M 4/66* (2013.01); *H01M 4/661* (2013.01); *H01M 2004/028* (2013.01)

(56) References Cited

U.S. PATENT DOCUMENTS

| | | | |
|---|---|---|---|
| 2013/0130113 A1* | 5/2013 | Takano | H01M 4/505 429/223 |
| 2013/0313486 A1 | 11/2013 | Sugimori et al. | |
| 2014/0011092 A1* | 1/2014 | Yamamoto | B82Y 40/00 429/232 |
| 2014/0329093 A1 | 11/2014 | Nishio et al. | |
| 2015/0200402 A1 | 7/2015 | Yoshimoto et al. | |
| 2017/0331112 A1* | 11/2017 | Nakamura | H01G 11/36 |

FOREIGN PATENT DOCUMENTS

| | | | |
|---|---|---|---|
| CN | 104412433 A | 3/2015 | |
| CN | 105283514 A | 1/2016 | |
| EP | 2251465 A1 | 11/2010 | |
| JP | 2004299986 A | 10/2004 | |
| JP | 2004300631 A | 10/2004 | |
| JP | 2006152490 A | 6/2006 | |
| JP | 2009016265 A | 1/2009 | |
| JP | 2010238575 A | 10/2010 | |
| JP | 2013077479 A | 4/2013 | |
| JP | 2014019619 A | 2/2014 | |
| JP | 2015115106 A | 6/2015 | |
| JP | 2016028109 A | 2/2016 | |
| WO | 2009110570 A1 | 9/2009 | |
| WO | 2012053334 A1 | 4/2012 | |
| WO | 2016024525 A1 | 2/2016 | |
| WO | 2016039336 A1 | 3/2016 | |
| WO | 2016084697 A1 | 6/2016 | |
| WO | WO-2016084697 A1 * | 6/2016 | ............ H01M 4/043 |

OTHER PUBLICATIONS

Supplemental European Search Report for EP 17848399 dated Aug. 5, 2019.
English Abstract for JP 2004299986 A (2004).
English Abstract for JP 2004300631 A (2004).
English Abstract for JP 2006152490 A (2006).
English Abstract for JP 2009016265 A (2009).
English Abstract for JP 2010238575 A (2010).
English Abstract for JP 2013077479 A (2013).
English Abstract for JP 2014019619 A (2014).
English Abstract for JP 2015115106 A (2015).
English Abstract for JP 2016028109 A (2016).
English Abstract for CN 105283514 A (2016).
Chinese Office Action dated Aug. 25, 2021.
Japanese Office Action dated Jul. 6, 2021.

* cited by examiner

[FIG. 1]
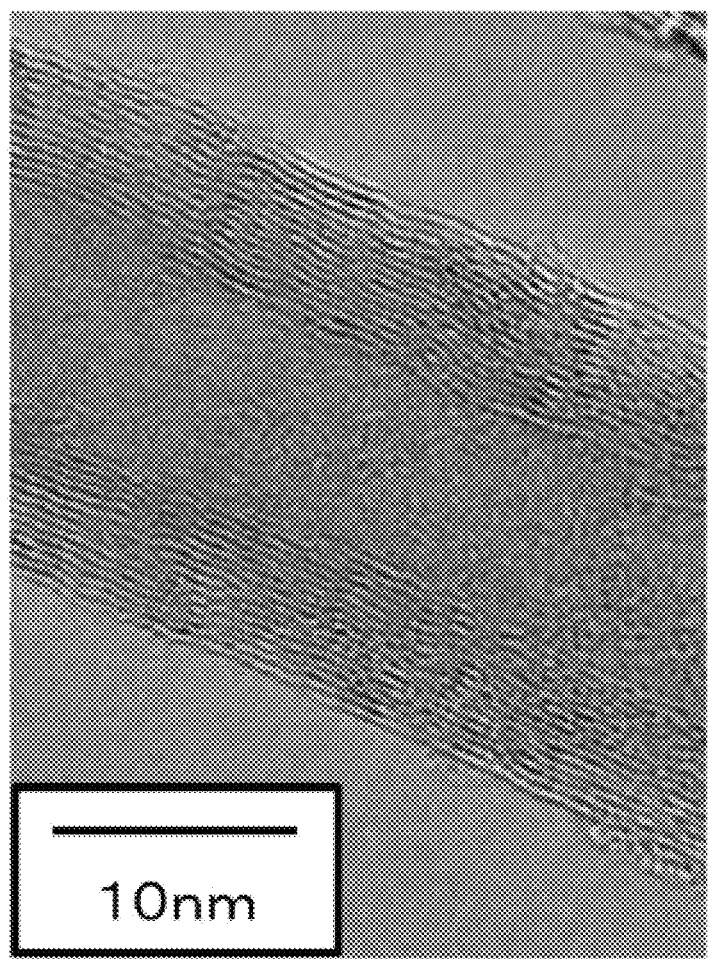

[FIG. 2]
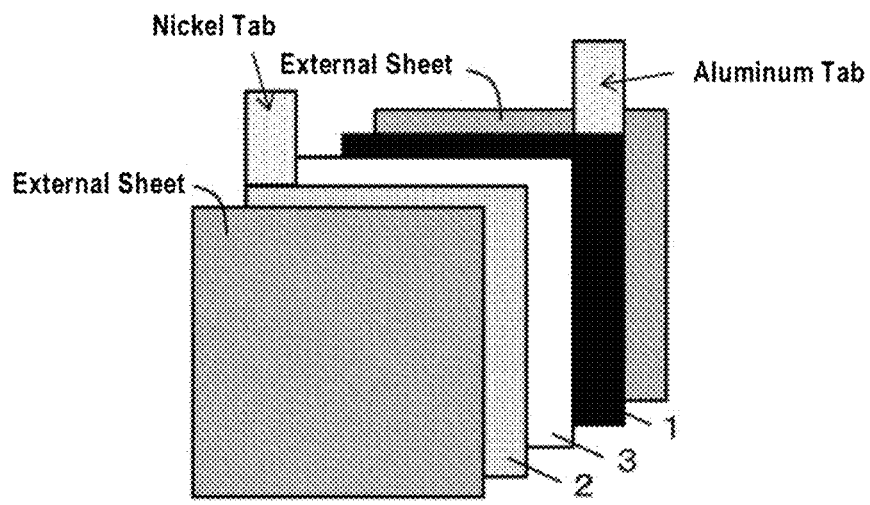
[FIG. 3]
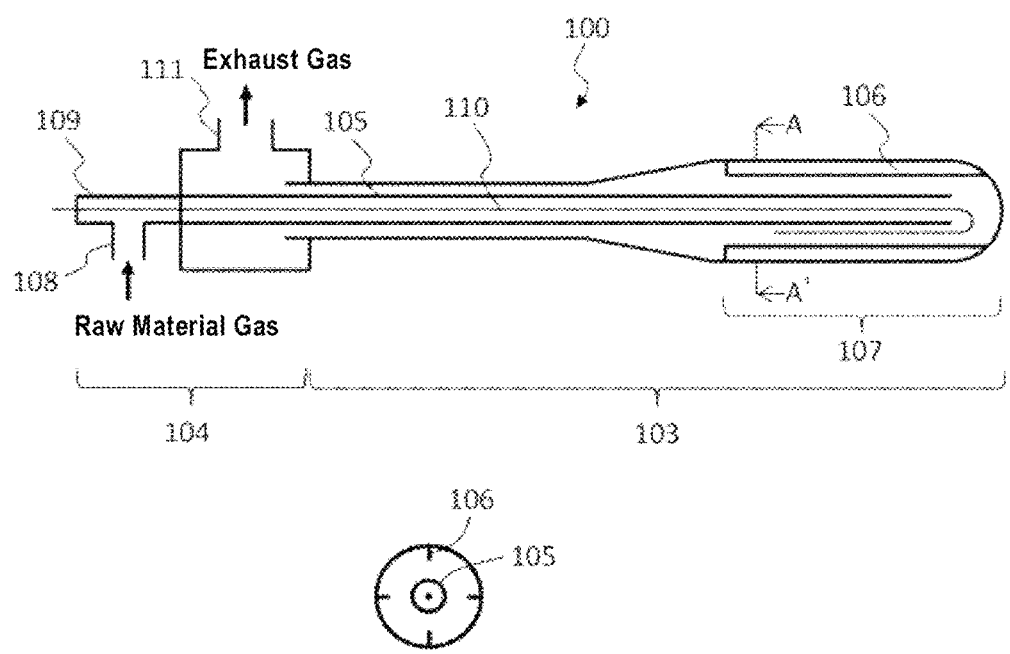
End Surface View Taken Along A-A' Line

CONDUCTIVE COMPOSITION FOR ELECTRODES, AND ELECTRODE AND BATTERY USING SAME

CROSS-REFERENCE TO RELATED APPLICATIONS

This application is the U.S. National Phase Application of PCT/JP2017/024408, filed Jul. 3, 2017, which claims priority from JP 2016-174800, filed Sep. 7, 2016, the contents of which applications are incorporated herein by reference in their entireties for all purposes.

TECHNICAL FIELD

The present invention relates to a conductive composition for electrodes, as well as an electrode and a battery using the same.

BACKGROUND ART

Recently, a surge of environmental and energy issues leads to vigorous development of technologies for realizing a low-carbon society that reduces dependency on fossil fuels. Such technological developments include many different fields, including development of low-emission vehicles such as hybrid electric vehicles and electric vehicles, development of natural energy power generation and storage systems such as solar power generation and wind power generation, development of next-generation electricity transmission network that efficiently supplies electric power and reduces power transmission loss, and the like.

One of key devices commonly required for those technologies is a battery. Such a battery requires a high energy density for downsizing the system. Further, there is a need for high output characteristics that enable stable supply of electric power regardless of operating ambient temperatures. Furthermore, there is also a need for good cycle characteristics and the like that can withstand long-term use. Therefore, conventional lead storage batteries, nickel-cadmium batteries and nickel-hydrogen batteries have been rapidly replaced with lithium-ion secondary batteries having higher energy density, output characteristics and cycle characteristics.

A basic structure of such a lithium ion secondary battery is composed of a positive electrode, a negative electrode, a separator, and a non-aqueous electrolytic solution. In general, the positive electrode that is used is obtained by applying a positive electrode material coating containing a positive electrode active material capable of storing and releasing lithium ions, a conductive material, a binding material and an organic solvent onto an aluminum foil current collector, and drying and forming the coating into a film.

The above positive electrode has been used to a charge/discharge capacity close to an effective charge/discharge capacity of the active material alone, and the energy density as the positive electrode has been close to the limit. Therefore, to improve a utilization ratio of the positive electrode, carbon nanotubes (hereinafter referred to as CNTs) which are conductive carbon materials and a mixture of carbon black (hereinafter referred to as CB) and CNTs are used as the conductive materials for the positive electrode. When CNTs are used or added, it is characterized by obtaining high conductivity with a relatively low conductive carbon material content, and expectations focuses on the CNTs. Here, the CNT generally has a fibrous shape having an outer diameter of from 5 to 100 nm and an aspect ratio of 10 or more, which indicates a ratio of the fiber length to the outer diameter.

Conventionally, an electrode discharging method, a catalyst vapor phase growth method, a laser method and the like are used for the production of CNTs, among which the catalyst vapor phase growth method is considered to be most suitable as an industrial production method. The catalytic vapor phase growth methods are generally carried out by bringing transition metal particles as a catalyst into contact with a raw material gas as a carbon source such as acetylene and benzene, thereby growing CNTs from the catalyst particles at a high temperature of 900° C. or more. Among others, a method for producing CNTs from a gas based on carbon monoxide as a raw material, using a transition metal component such as cobalt as a catalyst attracts attention as a method for obtaining high-purity and high-quality CNTs at a relatively low temperature (Patent Documents 1 to 5). However, its yield and activity are not satisfactory, and there is a need for further higher activity of the catalyst. When using the resulting CNTs as a conductive material, there is a need for CNTs having a higher conductivity (lower powder resistivity).

When the CNTs are used as conductive materials for a positive electrode for a lithium ion secondary battery, dispersibility of the CNTs in the positive electrode is important. However, fine carbon fibers such as the conventional CNTs form a secondary structure in which the fibers are complicatedly entangled with each other, and have insufficient dispersibility in the positive electrode, so that a binder is incorporated into the complicatedly entangled secondary structure, a bonding property at a boundary surface between the positive electrode material and the aluminum current collector, and a battery performance is also decreased. In addition, there is a problem that a cost of dispersion is increased.

A means for obtaining a good dispersed state of CNTs in the positive electrode includes a method for suppressing aggregation of CNTs by dry-mixing an active material and carbon fibers, and then mixing the dry mixture with the binder and a solvent (Patent Document 6). However, according to the method of Patent Document 6, it is difficult to disperse CNTs completely and uniformly in the positive electrode slurry. Further, the method requires increased addition ratio of CNTs in the positive electrode slurry because of insufficient dispersion in order to maintain the conductivity by the conductive material in the positive electrode, thereby causing problems that an amount of an active material directly contributing to a charge/discharge capacity in the positive electrode is decreased and an energy density as the positive electrode is decreased.

Further, another means for obtaining a good dispersed state of CNTs includes a method for subjecting CNTs to a surface oxidation treatment using concentrated nitric acid and concentrated sulfuric acid to disperse the CNTs in a solvent uniformly (Patent Document 7). However, the method of Patent Document 7 causes problems that conductivity of CNTs is decreased by the oxidation treatment, and a higher cost is incurred because the concentrated nitric acid and the concentrated sulfuric acid are used.

CITATION LIST

Patent Literatures

Patent Document 1: Japanese Patent Application Publication No. 2004-299986 A
Patent Document 2: Japanese Patent Application Publication No. 2004-300631 A
Patent Document 3: Japanese Patent Application Publication No. 2006-152490 A
Patent Document 4: WO 2009/110570 A1
Patent Document 5: WO 2012/053334 A1
Patent Document 6: Japanese Patent Application Publication No. 2009-16265 A
Patent Document 7: Japanese Patent Application Publication No. 2013-77479 A

SUMMARY OF INVENTION

Technical Problem

As described above, CNTs are expensive in terms of their production and dispersion for imparting high conductivity, and hence their applications are limited. When the cost has been emphasized, costly advantageous CB (acetylene black or Ketjen black) or the like has been used.

A conductive material composed of carbon materials having different shapes (hereinafter referred to as "carbon conductive material") will provide various conductivity properties to the inside of the positive electrode depending on its shape and addition amount, in the future. In particular, the use of CNTs having an increased aspect ratio (length to diameter) and improved dispersibility in combination with the carbon material such as the conventional inexpensive CB or the like will have a potential for resulting in a carbon conductive material that has improved cost performance.

The present invention has been made in view of the above circumstances. An object of the present invention is to provide a conductive composition for electrodes, comprising CB having improved conductivity and multi-walled CNTs having improved conductivity and dispersibility; and an electrode using the same, which has lower pole plate resistance and improved binding properties; and a non-aqueous battery using the same, which has a higher energy density, higher output characteristics and good cycle characteristics.

Solution to Problem

Thus, the present invention for solving the above problems relates to:

(1) A conductive composition for electrodes, comprising: a conductive material containing carbon black and multi-walled carbon nanotubes; an active material; a binder; and a dispersant, wherein the multi-walled carbon nanotubes satisfy the following conditions [1] to [3]:

[1] a powder resistivity of 0.035 Ω·cm or less, as measured under a load of 9.8 MPa;
[2] a volume-converted median diameter D50 value of from 0.3 to 8 μm, as measured in accordance with JIS Z 8825; and
[3] a content of from 3 to 50% by mass in the conductive material.

(2) The conductive composition for electrodes according to (1), wherein the carbon black used has a number-average primary particle diameter of from 20 to 40 nm and a DBP oil absorption amount of from 200 to 320 ml/100 g as measured in accordance with JIS K 6217-4.

(3) The conductive composition for electrodes according to (1) or (2), wherein each of the multi-walled carbon nanotubes used has a D/G value of from 0.8 to 1.3 according to Raman spectroscopic measurement.

(4) The conductive composition for electrodes according to any one of (1) to (3), wherein the carbon black used is acetylene black.

(5) The conductive composition for electrodes according to any one of (1) to (4), wherein a content of the conductive material used is from 0.1 to 2% by mass relative to the total amount of the conductive composition for electrodes.

(6) The conductive composition for electrodes according to any one of (1) to (5), wherein the active material used is at least one selected from $LiCoO_2$, $LiMn_2O_4$, $LiNiO_2$, $LiMPO_4$, $Li_2MSiO_4$, $LiNi_xMn_{(2-x)}O_4$, $Li(Mn_xNi_YCo_Z)O_2$, $Li(Al_xNi_YCo_Z)O_2$ and $RLi_2MnO_3\text{-}(1\text{-}R)LiMO_2$, in which X in the $LiNi_xMn_{(2-x)}O_4$ satisfies a relationship: $0<X<2$; X, Y and Z in $Li(Mn_xNi_YCo_Z)O_2$ or $Li(Al_xNi_YCo_Z)O_2$ satisfy relationships: $X+Y+Z=1$, and $0<X<1$, $0<Y<1$, and $0<Z<1$; and R in $RLi_2MnO_3\text{-}(1\text{-}R)LiMO_2$ satisfies a relationship: $0<R<1$; and M in $LiMPO_4$, $Li_2MSiO_4$ or $RLi_2MnO_3\text{-}(1\text{-}R)LiMO_2$ is at least one element selected from Fe, Co, Ni and Mn.

(7) The conductive composition for electrodes according to any one of (1) to (6), wherein the dispersant used is at least one of polyvinyl pyrrolidone and copolymers comprising polyvinyl pyrrolidone.

(8) A positive electrode for non-aqueous batteries comprising the conductive composition for electrodes according to any one of (1) to (7).

(9) The positive electrode for non-aqueous batteries according to (8), wherein each of the conductive composition for electrodes and an aluminum foil current collector has a peel strength of 12 N/m or more as measured in accordance with JIS Z 0237.

(10) A non-aqueous battery comprising the positive electrode for non-aqueous batteries according to (8) or (9).

As used herein, the expression "from . . . to" means a range of "more than or equal to" and "less than or equal to" both limits, unless otherwise specified. For example, "from A to B" means more than or equal to A and less than or equal to B.

Advantageous Effects of Invention

According to the present invention, it is found that a conductive material containing carbon black and carbon nanotubes having a powder resistivity of 0.035 Ω·cm or less as measured under a load of 9.8 MPa and a volume-converted median diameter D50 value of from 0.3 to 8 μm as measured in accordance with JIS Z 8825 is used, and the content of the multi-walled carbon nanotubes in the conductive material is from 3 to 50% by mass, whereby a conductive composition for electrodes having good economy and conductivity and dispersibility can be obtained. Further, the conductive composition for electrodes according to the present invention forms strong conductive paths due to improvement of dispersibility, so that the conductive composition provides an improved binding property and a decreased pole plate resistance when used as a positive electrode for non-aqueous batteries, and provides a higher energy density, higher output characteristics and good cycle characteristics when used as a non-aqueous battery.

BRIEF DESCRIPTION OF DRAWINGS

FIG. 1 is a TEM image of CNT used in the present invention.

FIG. 2 is a schematic view of a non-aqueous battery used in the present invention.

FIG. 3 is a view of a rotary reactor used for synthesis of CNTs used in the present invention.

DESCRIPTION OF THE PREFERRED EMBODIMENTS

Hereinafter, the present invention will be described in detail.

[Configuration of Present Invention]

The present invention relates to a conductive composition for electrodes, including a conductive material containing carbon black; and multi-walled carbon nanotubes having a powder resistivity of 0.035 Ω·cm or less as measured under a load of 9.8 MPa, a volume-converted median diameter D50 value of from 0.3 to 8 μm as measured in accordance with JIS Z 8825; an active material; a binder; and a dispersant, wherein a content of the conductive material is from 3 to 50% by mass; and to an electrode and a battery using the same.

Hereinafter, constituent materials of the present invention will be described in detail.

<Carbon Black>

Carbon black (CB) used in the present invention is selected from acetylene black, furnace black, channel black and the like, as with carbon black for a general conductive material for batteries. Among them, acetylene black having good crystallinity and purity is more preferable. Preferably, the carbon black also has a number-average primary particle size of from 20 to 40 nm, a DBP oil absorption amount of from 200 to 320 ml/100 g, and more preferably from 260 to 320 ml/100 g, as measured according to JIS K 6217-4. The number-average primary particle diameter of 20 nm or more allows suppression of inter-particle interaction and easily provide dispersibility. Further, the number-average primary particle size of 40 nm or less results in the presence of a larger number of electrical contacts in the conductive material having the same mass, so that good electrical conductivity tends to be obtained.

<Multi-Walled Carbon Nanotube>

Multi-walled carbon nanotubes (MWCNTs) used in the present invention refer to multi-walled carbon nanotubes (MWCNTs) having an average outer diameter of from 5 to 100 nm, preferably from 5 to 50 nm, and an aspect ratio indicating a ratio of fiber length to outer diameter of 10 or more. Each of the multi-walled carbon nanotubes has an outer diameter of about 5 nm or more. If the outer diameter is too large, for example, it exceeds 50 nm, the number of multi-walled carbon nanotubes per unit weight is decreased, which may make it difficult to form conductive network.

The multi-walled carbon nanotubes (MWCNTs) do not include single-walled carbon nanotubes (SWCNTs). Although the single-walled carbon nanotubes have a characteristic of exhibiting high conductivity, they have practical problems that isomers due to chirality are present and a strong bundle structure is formed to make dispersion difficult. Therefore, the SWCNTs are not intended by the present invention. FIG. 1 shows a TEM photograph of the MWCNT synthesized in Synthesis Example 1 as a representative example of the multi-walled carbon nanotubes used in the present invention.

The MWCNTs used in the present invention has a volume-converted median diameter D50 value of from 0.3 to 8 μm, and preferably from 0.3 to 3 μm, and most preferably from 0.3 to 1 μm, as measured in accordance with JIS Z 8825. Here, the median diameter D50 value can be determined by irradiating the MWCNT particles with a laser beam and converting a MWCNT diameter into a spherical shape from its scattered light. As the median diameter D50 value is larger, more aggregates of MWCNTs are present, which means poor dispersibility. If the median diameter D50 value is larger than 8 μm, it is highly likely that aggregates of MWCNTs are present in the electrode, which will bring about uneven conductivity of the entire electrode. As a result, capacity and output characteristics of the electrode for batteries are deteriorated. On the other hand, if the median diameter D50 value is less than 0.3 μm, the fiber length of MWCNT becomes short, and contact points are increased when MWCNTs form conductive paths between the active material and the current collector, so that the conductivity is decreased due to increased contact resistance. When the median diameter D50 value is in a range of from 0.3 to 8 μm, the MWCNTs can be uniformly dispersed in the electrode while maintaining the conductivity. Further, the use of the MWCNTs having a median diameter D50 value in a range of from 1 to 2.9 μm provides higher dispersibility in the electrode than the case where the median diameter D50 value is in the range of from 3 to 8 μm, thereby allowing lower resistance of the electrode. Furthermore, the use of MWCNTs having a median diameter D50 value in a range of from 0.3 to 0.9 μm provides higher dispersibility in the electrode than the case where the median diameter D50 value is in the range of from 1 to 2.9 μm, thereby allowing lower electrode resistance of the electrode.

The MWCNTs used in the present invention has a D/G value of from 0.8 to 1.3, and more preferably from 0.8 to 1.0, as obtained by Raman spectrometric measurement. The MWCNTs having the D/G value of from 0.8 to 1.3 has improved conductivity and crystallinity. Here, the D/G value can be obtained from a ratio of the sum of areas derived from D band peaks to the sum of areas derived from G band peaks when performing Raman spectroscopic measurement of the MWCNT powder. The lower the D/G value, the higher the crystallinity of MWCNTs, which means that the conductivity of MWCNTs is higher. If the D/G value is more than 1.3, the bending of the MWCNTs is increased to generate complicated entanglement between the MWCNTs and a high possibility that aggregates of the MWCNTs in the electrode, so that conductivity becomes uneven. As a result, the capacity and output characteristics of the electrode for batteries are deteriorated. However, to decrease the D/G value, an additional treatment step for improving crystallinity is required, and MWCNTs having good crystallinity cannot be easily obtained. On the other hand, in the method that uses the catalyst according to the present invention, the MWCNTs having good crystallinity such as the D/G value of from 0.8 to 1.5 can be efficiently obtained by controlling a synthesis temperature and synthesis time.

The MWCNTs used in the present invention have a powder resistivity of 0.035 Ω·cm or less as measured under a load of 9.8 Mpa. If the powder resistivity is more than 0.035 Ω·cm, the conductivity between the active material and the electrode will be decreased.

The catalyst for synthesizing MWCNTs used in the present invention may be preferably an active species mainly based on cobalt as a catalyst. Preferably, using a catalyst obtained by supporting from 3 to 150% by mass of the active species mainly based on cobalt on a support composed of an oxide containing magnesium having a BET specific surface area of from 0.01 to 5 m²/g (hereinafter referred to as cobalt-magnesium oxide supported catalyst), the MWCNTs are synthesized. Cobalt can be contained not only in the form of metallic cobalt but also in the form of compounds such as oxides, hydroxides, hydrous oxides, nitrates, acetates, oxalates and carbonates. A synthetic activity as used herein refers to a mass of MWCNTs obtained per unit time per unit mass of active species. A catalytic activity as used herein refers to a mass of MWCNTs obtained per unit time per unit mass of catalyst. The active species as used herein is a metal based on cobalt as a main component. Further, the support refers to an oxide for supporting the active species.

When the oxide containing magnesium is used as a support for the active species, examples of the oxide containing magnesium include magnesium oxide, and spinel type oxides and perovskite type oxides which contain magnesium, and the like. Among them, magnesium oxide is most preferable as a support. A BET specific surface area of the oxide containing magnesium is preferably from 0.01 to 5 m²/g, and more preferably from 0.01 to 3 m²/g, in terms of dispersibility of MWCNTs.

When cobalt is used as the active species, a supporting ratio is preferably from 3 to 150% by mass, and more preferably from 5 to 120% by mass, and most preferably from 10 to 90% by mass. If the supporting ratio is less than 3% by mass, the conductivity of MWCNTs obtained may be deteriorated. On the other hand, if it is more than 150% by mass, a particle diameter of the cobalt particles may be increased and the synthetic activity may be decreased.

When supporting cobalt on the support, the supporting method is not particularly limited. For example, cobalt can be supported on the support by impregnating the support in a non-aqueous solution (for example, ethanol solution) in which cobalt salts have been dissolved, sufficiently dispersing and mixing them, and then drying them, and heating them in an air at an elevated temperature (from 300 to 600° C.). Alternatively, cobalt may be supported on the support by merely impregnating the support in a non-aqueous solution (for example, ethanol) or an aqueous solution in which cobalt salts have been dissolved, sufficiently dispersing and mixing them, and then removing moisture to dry the residue.

The MWCNTs used in the present invention preferably use carbon monoxide as a carbon source for the MWCNTs. Carbon monoxide used as a raw material gas may be used as a mixed gas with carbon dioxide or hydrogen, or may contain an inert gas such as nitrogen gas. A partial pressure of carbon monoxide is preferably from 0.04 to 0.98 MPa, and more preferably from 0.05 to 0.3 MPa, and most preferably from 0.05 to 0.1 MPa. If the partial pressure of the carbon monoxide gas is less than 0.04 MPa, the synthesis activity may be lowered, and the crystallinity and conductivity of the resulting MWCNTs may be decreased. If the partial pressure of the carbon monoxide gas is more than 0.98 MPa, the dispersibility of MWCNTs obtained and deactivation of the catalyst will become severe, so that the synthetic activity may be decreased.

A partial pressure of the hydrogen gas is preferably from 1 to 100%, and more preferably from 10 to 100%, relative to the partial pressure of the carbon monoxide gas. If the ratio of the partial pressure of the hydrogen gas to the partial pressure of the carbon monoxide gas is more than 100%, the synthesis activity may be decreased, and the crystallinity and conductivity of the resulting MWCNTs may be decreased. If the partial pressure of the hydrogen gas is less than 1%, the catalyst may be inactivated at an early stage, which may cause a decrease in synthetic activity.

It should be noted that the ratio of the partial pressure of the hydrogen gas to the partial pressure of the carbon monoxide gas can be calculated by the following equation:

Ratio of Partial Pressure of Hydrogen Gas to Partial Pressure of Carbon Monoxide Gas=$X1/X2 \times 100$ (%), in which:
$X1$ is a molar ratio of the hydrogen gas, and $X2$ is a molar ratio of the carbon monoxide gas.

For example, in a case of a mixed gas having a raw material gas composition of $CO/H_2/N_2=85/15/0$, the ratio of the partial pressure of the hydrogen gas to the partial pressure of the carbon monoxide gas can be calculated as follows:

Ratio of Partial Pressure of Hydrogen Gas to Partial Pressure of Carbon Monoxide Gas=$15/85 \times 100=18$(%).

The total gas partial pressure of the raw material gases of carbon monoxide, hydrogen and carbon dioxide plus an inert gas is less than 1.0 MPa. If the total pressure is more than 1.0 MPa, costs for high pressure facility equipment and utilities for production may be increased. Further, if it is significantly reduced pressure as compared with 0.1 MPa (atmospheric pressure), for example, if it is less than 0.08 MPa, it will be difficult to seal a high temperature reactor for preventing penetration of the atmosphere (oxygen), which may not be preferable.

A flow rate of the carbon monoxide gas is preferably 1 NL/g-active species-minute or more. By setting the flow rate of the carbon monoxide gas to be in the range, the MWCNTs can be produced with high synthetic activity. As used herein, the high synthetic activity specifically means 10 g-MWCNTs/g-active species hour or more. Although any upper limit of the flow rate of the carbon monoxide gas is not particularly set, more than 200 NL/g-active species-minute leads to an excessively high flow rate of the gas, so that utility costs for remaining heat is increased, which is not preferable. In addition, the synthetic activity may be decreased.

It should be noted that "NL" represent a gas amount L (liter) converted into a standard condition (0° C., 1 atm), and "NL/g-active species-minute" represents a gas flow rate for 1 minute under the presence of the active species per unit mass (per 1 g of active species).

A reaction temperature during MWCNT synthesis is preferably from 670 to 780° C., and more preferably from 700 to 750° C. If the reaction temperature is lower than 670° C., the crystallinity, conductivity and dispersibility of the MWCNTs may be decreased. On the other hand, if the temperature is higher than 780° C., the synthetic activity may be decreased. For example, the MWCNTs may also be synthesized by the method as described in WO2015/119102.

A reactor that can be used in production of MWCNTs includes any known reactor such as a fixed bed, a fluidized bed or a rotary kiln. Preferably, it is possible to use the reactor having any shape capable of housing the catalyst in a gas atmosphere containing a carbon-containing compound, and having a function of mechanically stirring the catalyst and the produced MWCNTs by mechanically operating a part or the whole of the reactor. The movable part of the reactor may be a part such as a stirring blade or a paddle, or the reactor itself may rotate or vibrate. An example of the latter may be a rotary kiln reactor. In the present invention, the reactor having a function of mechanically stirring may be preferably a rotary type reactor, and more preferably a horizontal rotary reactor having a slight gradient such as a rotary kiln reactor. The catalyst in the reactor and the MWCNTs produced can be mechanically stirred to bring them into contact with the carbon-containing gas as raw material with high uniformity. The reaction in this reactor may be of batch type or continuous type.

For the MWCNTs produced, the active species and the support are preferably removed in order to increase the purity. More particularly, the active species and the support are removed by dispersing MWCNTs in an acid such as hydrochloric acid, nitric acid and sulfuric acid, and then collecting the MWCNTs by a means such as filtration and centrifugation, as described in Japanese Patent Application Publication No. 2006-69850 A and the like.

<Active Material>

An active material as used herein refers to a lithium-containing composite oxide or a lithium-containing polyanionic compound containing Mn having a volume resistivity of $1 \times 10^4$ $\Omega \cdot cm$ or more, which is a positive electrode active material capable of reversibly occluding and releasing cations. Examples of the active material include $LiCoO_2$, $LiMn_2O_4$, $LiNiO_2$, $LiMPO_4$, $Li_2MSiO_4$, $LiNi_xMn_{(2-X)}O_4$, $Li(Mn_xNi_yCo_Z)O_2$, $Li(Al_xNi_yCo_Z)O_2$ or $RLi_2MnO_3\text{-}(1\text{-}R)LiMO_2$. Here, it is preferable that X in the $LiNi_xMn_{(2-X)}O_4$ satisfies a relationship: $0<X<2$; X, Y and Z in $Li(Mn_xNi_yCo_Z)O_2$ or $Li(Al_xNi_yCo_Z)O_2$ satisfy relationships: $X+Y+Z=1$, and $0<X<1$, $0<Y<1$, and $0<Z<1$; and R in $RLi_2MnO_3\text{-}(1\text{-}R)LiMO_2$ satisfies a relationship: $0<R<1$; and M in $LiMPO_4$, $Li_2MSiO_4$ or $RLi_2MnO_3\text{-}(1\text{-}R)LiMO_2$ is at least one element selected from Fe, Co, Ni and Mn.

Among the above active materials, the active material used in the present invention preferably has an average particle diameter (D50) of 20 µm or less, and preferably 5 µm or less, as measured by laser light scattering method. This will lead to sufficient development of an effect of improving a binding property between the conductive material and the binder, so that a positive electrode having good peel strength and a battery having high cycle characteristics are easily obtained.

<Binder>

Examples of the binder include polyvinylidene fluoride (PVdF), polytetrafluoroethylene, a styrene butadiene copolymer, a (meth)acrylate copolymer, polyvinyl alcohol, and a copolymer of polyvinyl alcohol and polyacrylonitrile. The structure of the polymer as a binder is not particularly limited, and random copolymers, alternating copolymers, graft copolymers, block copolymers and the like can also be used. Among them, PVdF is preferable in terms of oxidation resistance.

<Dispersant>

Preferably, the dispersant that can be used may be, for example, at least one selected from polyvinyl pyrrolidone, polyvinyl imidazole, polyethylene glycol, polyvinyl alcohol, polyvinyl butyral, carboxymethyl cellulose, acetyl cellulose or carboxylic acid-modified (meth)acrylate copolymers. Among them, the dispersant includes, more preferably, at least one selected from polyvinyl pyrrolidone and copolymers containing polyvinyl pyrrolidone. Among them, the copolymer containing polyvinylpyrrolidone is preferred. By containing the dispersant, the dispersibility of the conductive material in the conductive composition for electrodes is further improved.

<Conductive Composition for Electrodes>

The conductive composition for electrodes used in the present invention can be produced by a method known in the art. For example, the conductive composition is obtained by mixing a dispersed solution of a conductive material containing CB and MWCNTs, an active material, a dispersant, and a binder in a solvent using a ball mill, a sand mill, a twin-screw kneader, a rotation revolution agitator, a planetary mixer, a disper mixer or the like, and the conductive composition is generally used in the form of a slurry. As the conductive material containing the CB and MWCNTs, the active material and the binder, those as described above may be used. The CB and MWCNTs may be separately introduced into the mixer or previously mixed by a known method. It should be noted that a viscosity modifier may be used to adjust a viscosity of the positive electrode slurry for non-aqueous batteries, which contains the electrode conductive composition. Examples of the viscosity modifier include water-soluble polymers such as polyvinyl alcohol, carboxymethyl cellulose and salts thereof, methyl cellulose and salts thereof, polymethacrylic acid and salts thereof. Specific examples of the salts include alkali metals such as sodium and potassium.

The content of the conductive material in the conductive composition for electrodes used in the present invention is preferably from 0.1 to 2% by mass, and more preferably from 0.5 to 1% by mass, based on the total amount of the electrode conductive composition, in order to achieve both dispersibility and conductivity. The range varies depending on the types of the batteries and the active materials, and the content does not necessarily have to be within this range. It should be noted that the conductive material may include a conductive material other than the conductive material used in the present invention. The conductive material that can be used includes carbon fibers, artificial graphite, natural graphite, carbon black such as acetylene black and furnace black, expanded graphite, metallic powder and the like.

The content of MWCNTs in the conductive material used in the present invention is preferably from 3 to 50% by mass, and more preferably from 5 to 30% by mass, in order to achieve both the dispersibility and conductivity. If the content of MWCNTs is less than 3% by mass, uneven conductive paths will be formed in the electrode, and as a result, the capacity and output characteristics as the electrode for batteries will be deteriorated. On the other hand, if the content of MWCNTs is more than 50% by mass, stronger entanglement of MWCNTs will be formed and a large number of aggregates of MWCNTs will be present in the electrode, so that the conductivity is decreased.

<Positive Electrode for Non-Aqueous Batteries>

The positive electrode for non-aqueous batteries used in the present invention is prepared by applying a positive electrode slurry for non-aqueous batteries containing the above conductive composition for electrodes onto a current collector such as an aluminum foil, and then removing a solvent contained in the slurry by heating to form an electrode mixture layer that is a porous body in which the positive electrode active material is bonded to the surface of the current collector via the binder. Further, the current collector and the electrode mixture layer can be pressurized with a roll press or the like to bring them into close contact with each other to obtain an electrode of interest.

The positive electrode for non-aqueous batteries used in the present invention preferably has a peel strength of 12 N/m or more as measured according to JIS Z 0237. The peel strength of 12 N/m or more allows both of high rate characteristics and cycle characteristics to be achieved in a non-aqueous battery that utilizes the positive electrode for non-aqueous batteries according to the present invention.

<Non-Aqueous Battery>

A method for producing the non-aqueous battery used in the present invention is not particularly limited, and the production may be performed using a conventionally known method for producing a secondary battery. For example, with the configuration schematically shown in FIG. 2, the non-aqueous battery can be produced by the following method. That is, the non-aqueous battery can be produced by welding an aluminum tab to a positive electrode for non-aqueous batteries 1, welding a nickel tab to a negative electrode for non-aqueous batteries 2, and then disposing a polyolefin microporous film 3 that will form an insulating layer between the electrodes, pouring a non-aqueous electrolytic solution until the non-aqueous electrolytic solution sufficiently penetrates void portions of the positive electrode for non-aqueous batteries 1, the negative electrode for non-aqueous batteries 2 and the polyolefin microporous film 3, and sealing them with an external sheet.

The non-aqueous battery according to the present invention can be used in non-limiting various fields such as, for example, portable AV devices such as digital cameras, video cameras, portable audio players and portable liquid crystal televisions; portable information terminals such as laptop computers, smart phones and mobile PCs, as well as mobile game deices, electric tools, electric bicycles, hybrid motor vehicles, electric motor vehicles, electric power storage systems, and the like.

EXAMPLES

Hereinafter, the present invention will be more specifically described with reference to Examples and Comparative Examples, but the present invention is not limited to the following Examples as long as the spirit of the present invention is not impaired. Further, members used in both Examples and Comparative Examples were vacuum-dried at 170° C. for 3 hours in order to volatilize adsorbed moisture.

<Rotary Synthesis Reactor for MWCNTs>

A horizontal rotary reactor 100 schematically shown in FIG. 3 was connected to a commercially available rotary evaporator rotating device (N-1110 V available from TOKYO RIKAKIKAI CO., LTD.) (not shown), and reaction was carried out batchwise. The reactor 100 is composed of a fixed portion 104 (non-rotating; made of heat-resistant glass) and a rotating portion 103 (made of cylindrical quartz glass). Further, at a center of the reactor 100 is a non-rotating gas introduction portion 105 (tubular; a diameter of 12 mm) connected to the fixed portion 104. A tip of the rotating portion 103 has a reaction portion 107 (a length of about 20 cm, and a diameter of 5 cm) with a stirring blade 106 on an inner wall of the cylindrical portion. An arrangement of the stirring blade 106 is as shown in the end surface view taken along the line A-A' in FIG. 3. The fixed portion 104 is provided with a gas introduction pipe 108 vertically connected to the gas introduction portion 105 and a thermocouple introduction pipe 109 straightly connected to the gas introduction portion 105. From the thermocouple introduction pipe 109, a sealed thermocouple 110 is inserted and inverted at 180 degrees outside an outlet of the gas introduction portion 105, and a thermocouple temperature measuring portion measures a temperature of a gas phase in the reaction portion 107 outside the gas introduction portion 105. There are three thermocouples 110, which measure temperatures of a center, a right end portion and a left end portion of the reaction portion 107. The entire reaction portion 107 can be uniformly heated by independently controlling three electric furnaces of a three-zone horizontal type tubular electric furnace (not shown) arranged on an outer periphery of the reaction portion 107. A gas exhaust pipe 111 connected to the outer peripheral portion of the fixed portion 104 is provided, which discharges an exhaust gas from the reaction portion 107.

<Reaction>

The reaction was carried out by introducing a predetermined amount of a catalyst and a fluidizing material into the reaction portion 107 of the reactor 100, inclining the reactor 100 downward in a horizontal direction or slightly downward, and rotating the rotating portion 103 at a predetermined rotating rate while flowing a raw material gas from the gas introduction pipe 108, through the gas introduction portion 105 and the reaction portion 107, into the gas exhaust pipe 111.

<Preparation of Catalyst for Synthesis of MWCNT Conductive Material>

6.17 g of cobalt nitrate hexahydrate (3N5, available from KANTO KAGAKU) was weighed and dissolved in 30 g of a mixed solvent of distilled water and ethanol having a mass ratio of 2:1. To the aqueous cobalt nitrate solution was added 2.5 g of magnesium oxide (DENMAG® KMAOH-F, available from Tateho Co., Ltd.) having a BET specific surface area of 0.61 $m^2/g$, and stirred for one hour while being maintained in a hot water bath at 50° C. After stirring, water was evaporated with an evaporator. The resulting solid component was dried under vacuum at 60° C. for 24 hours and then fired at 400° C. for 5 hours. After firing, the resulting solid component was pulverized in an agate mortar to obtain a cobalt-magnesium oxide supported catalyst supporting 50% by mass of cobalt metal.

Synthesis Example 1 of MWCNTs

Carbon monoxide having G1 grade (purity of 99.95%) was used as a raw material, which was purchased from SUZUKI SHOKAN Co., Ltd. 0.62 g (an amount of active species of 0.25 g) of the prepared cobalt-magnesium oxide supported catalyst was placed in a rotary synthesis reactor, and the reactor was rotated at a rotation speed of 30 rpm under an atmospheric pressure (0.101 MPa), while purging with nitrogen by sufficiently flowing nitrogen, and temperature raising was started. Once the temperature reached 600° C., the gas was switched to a reducing gas of 80% of nitrogen and 20% of hydrogen, and the temperature was raised to 650° C. for about 20 minutes. After the temperature reached 650° C., a raw material gas having a partial pressure of carbon monoxide gas of 0.086 MPa and a partial pressure of hydrogen gas of 0.015 MPa was passed through the catalyst layer such that a flow rate of carbon monoxide gas was 3.9 NL/g-active species minute, and the reaction was carried out for 1 hour. The raw material gas was then switched to a nitrogen gas and immediately cooled. The MWCNTs synthesized in Synthesis Example 1 was referred to as MWCNT-A.

Synthesis Example 2 of MWCNTs

MWCNTs were synthesized by the same method as that of Synthetic Example 1, with the exception that once the temperature reached 600° C., the gas was switched to a reducing gas of 80% of nitrogen and 20% of hydrogen, and the temperature was raised to 610° C. for about 20 minutes, and after the temperature reached 610° C., a raw material gas having a partial pressure of carbon monoxide gas of 0.086 MPa and a partial pressure of hydrogen gas of 0.015 MPa was passed through the catalyst layer such that a flow rate of carbon monoxide gas was 1.0 NL/g-active species minute, and the reaction was carried out for 30 minutes. The MWCNTs synthesized in Synthesis Example 2 was referred to as MWCNT-B.

Synthesis Example 3 of MWCNTs

MWCNTs were synthesized by the same method as that of Synthetic Example 1, with the exception that a raw material gas having a partial pressure of carbon monoxide gas of 0.086 MPa and a partial pressure of hydrogen gas of 0.015 MPa was passed through the catalyst layer such that a flow rate of carbon monoxide gas was 5.3 NL/g-active species minute, and the reaction was carried out for 1 hour. The MWCNTs synthesized in Synthesis Example 3 was referred to as MWCNT-C.

<Cracking Treatment of MWCNTs>

A cracking treatment was carried out with a bead mill using MWCNT-A. For the beads mill, RMB-08 available from AIMEX Corporation was used. 0.8 g of MWCNT-A, 39.2 g of N-methyl-2-pyrrolidone and 160 g of zirconia φ 0.5 mm beads were added to a vessel, cracked at a stirring speed of 1000 rpm for a stirring time of 20 minutes, and CNF was then washed with water, filtered, and dried under vacuum at 120° C. for 10 hours. The MWCNTs obtained by the cracking treatment was referred to as MWCNT-D.

<Removal of Catalyst>

The synthesized MWCNTs contain magnesium oxide used as the support and the active species. When the catalytic activity is less than 3 g-MWCNT/g-catalyst hour, the amounts of magnesium oxide and active species in MWCNTs obtained in Synthesis Examples 1 to 3 are increased, and may affect the conductivity and dispersibility. Therefore, a removal treatment of magnesium oxide and active species was performed. First, 2 g of the synthesized MWCNTs was added to 400 mL of 2 mol/L hydrochloric acid, and subjected to a dispersing treatment at a rotation speed of 7000 rpm for 10 minutes using Robomix F model available from PRIMIX Corporation and Homomixer MARK 2-2.5 type for a stirring portion. Hydrochloric acid containing MWCNTs was then centrifuged, a supernatant was discarded, and distilled water was added and stirred. This procedure was repeated until chloride ions in the supernatant were not detected by an aqueous silver nitrate solution. The solid content was dried under reduced pressure at 110° C. for 13 hours to remove magnesium oxide and active species.

Powder characteristics of CB used in Examples and Comparative Examples were evaluated according to the following method.

[Number-Average Primary Particle Diameter]

A number-average primary particle diameter was measured by photographing five images of 100000 magnifications using a transmission electron microscope JEM-2000 FX (available from JEOL Ltd.), image-analyzing 200 or more randomly extracted primary particles to determine particle diameters, and calculating a number average of them.

[DBP Oil Absorption Amount]

A DBP oil absorption amount was measured by a method in accordance with JIS K 6217-4.

The results of the powder characteristics evaluation for CB used in Examples and Comparative Examples are shown in Table 1.

TABLE 1

| | Each CB | HS-100 | SB50L | FX-35 | SAB |
|---|---|---|---|---|---|
| Powder Characteristics | Number-Average Primary Particle Diameter [nm] | 48 | 37 | 23 | 21 |
| | DBP Oil Absorption Amount [ml/100 g] | 177 | 200 | 267 | 313 |

The powder characteristics of MWCNTs used in Examples and Comparative Examples were evaluated according to the following method.

[Powder Resistivity]

The powder resistivity of MWCNTs was measured by a four point probe method under a condition of a load of 9.8 MPa in an atmosphere at 23° C. and at a relative humidity of 50%, using Loresta-GP: a powder resistance measuring system MCP-PD 51 model available from Mitsubishi Chemical Analytics, Co., Ltd. 100 mg of each sample was used for the measurement.

[D/G Value by Raman Spectroscopic Measurement]

Raman spectroscopic measurement of MWCNTs was performed using a microscopic laser Raman spectroscopic analyzer (Niolet Almega-XR model available from Thermo Fisher Scientific, laser: 532 nm). After carrying out waveform separation of D bands (D1: peak position: 1330 cm$^{-1}$; D3: 1500 cm$^{-1}$; D4: 1150 cm$^{-1}$) and G bands (G+: 1600 cm$^{-1}$; G−: 1570 cm$^{-1}$), a ratio (D/G value) of the sum of areas derived from the D band peaks to the sum of areas derived from the G band peaks was determined. It indicates that the lower the D/G value, the higher the crystallinity of MWCNTs.

(Reference)

D1: derived from point defects in the graphite crystal structure, and defects from the crystal edge;

D3: derived from amorphous carbon;

D4: derived from polyene and ionic impurities;

G+: crystalline peak of graphite: longitudinal optical mode; and

G−: crystalline peak of graphite: transverse optical mode.

[Median Diameter D50 Value: Measurement of Particle Size Distribution by Laser Diffraction/Scattering Method (ISO 13320: 2009)]

Dispersibility was evaluated using a particle size distribution measuring apparatus (LS 13 320 Universal Liquid Module available from BECKMAN COULTER).

In addition, prior to the measurement of a percentage of dispersed particles having 1 μm or less and the median diameter D50 value, the particle size distribution measuring apparatus was tested, and when the median diameter D50 value obtained by the measurement of each of the following test samples satisfied all of the following conditions, measurement accuracy of the apparatus was determined to be pass and the particle size distribution measurement was carried out in Examples and Comparative Examples.

[Preparation of Water Dispersion Medium]

0.10 g of sodium carboxymethyl cellulose (hereinafter referred to as CMCNa) was added to 100 mL of distilled water and dissolved at 25° C. for 24 hours or more with stirring to prepare an aqueous dispersion medium containing 0.1% by mass of CMCNa.

[Preparation of Aqueous CMCNa Solution]

2.0 g of sodium carboxymethyl cellulose was added to 100 mL of distilled water and dissolved at 25° C. for 24 hours or more with stirring to prepare an aqueous solution containing 2.0% by mass of CMCNa.

[Preparation of Test Sample and Test]
(1) Test with Polystyrene Dispersion

A water dispersion LATRON 300 LS (a median diameter D50 value: 0.297 μm) for confirming measurement accuracy was used, which was attached to the particle size distribution measuring apparatus (LS 13 320 Universal Liquid Module available from BECKMAN COULTER).

An optical model was set to refractive indices of 1.600 for polystyrene and 1.333 for water. After the module was washed, about 1.0 mL of the above aqueous CMCNa solution was filled. After performing offset measurement, optical axis adjustment, background measurement under a condition of pump speed of 50%, LATRON 300 LS was added to the particle size distribution meter such that a relative density indicating a percentage of light scattered outside the beam by particles was from 8 to 12%, or PIDS (Polarization Intensity Differential Scattering) was from 40% to 55%, and the particle size distribution measurement was carried out. A graph of volume % relative to a particle size (particle diameter) was created and accuracy was confirmed. It was confirmed that a median diameter D50 value obtained by the measurement was within 0.297 μm±0.018 μm, a median D10 value was within 0.245 μm±0.024 μm, and a median D90 value was within 0.360 μm±0.036 μm.

(2) Test with Alumina Dispersion 0.120 g of each of alumina LS-13 (a median diameter D50 value: 45 μm) available from Denka Company Limited and alumina AS-50 (a median diameter D50 value: 6.7 μm) available from Showa Denko K.K. was weighed in a vial, and 12.0 g of the above aqueous dispersion medium was added, and the vial was thoroughly shaken to prepare an alumina aqueous dispersion.

An optical model was set to refractive indices of 1.768 for alumina and 1.333 for water. After the module was washed, about 1.0 mL of the above aqueous CMCNa solution was filled. After performing offset measurement, optical axis adjustment, background measurement under a condition of pump speed of 50%, the above aqueous alumina dispersion prepared above was added to the particle size distribution meter such that a relative density indicating a percentage of light scattered outside the beam by particles was from 8 to 12%, or PIDS (Polarization Intensity Differential Scattering) was from 40% to 55%, and the particle size distribution measurement was carried out. A graph of volume % relative to a particle size (particle diameter) was created and accuracy was confirmed. It was confirmed that median diameter D50 values obtained by the measurement were within 48.8 μm±5.0 μm for LS-13 and within 12.6 μm±0.75 μm for AS-50.

[Pretreatment for Measurement]

6.0 mg of MWCNTs was weighed in a vial, to which 6.0 g of the above aqueous dispersion medium was added. An ultrasonic homogenizer (Smurt NR-50 available from MICROTEC CO., LTD.) was used in pretreatment for measurement.

A chip was attached to a tip of the ultrasonic homogenizer, and it was confirmed that there was no deterioration of the chip, which otherwise would generate vibration. The chip was adjusted such that the chip was immersed into 10 mm or more from the liquid level of each treating sample. The chip used is such that the total of ultrasonic generation times is within 30 minutes, and preferably new chip is used. Homogenization was made by ultrasonic irradiation under operation conditions of an irradiation time of 40 seconds, an output of 50%, and a constant output electric power to prepare an aqueous CNT dispersion.

[Measurement of Particle Size Distribution of MWCNTs]

Using the aqueous dispersion of MWCNTs prepared by the above method, a median diameter D50 value of MWCNTs was measured according to the following method. An optical model of LS 13 320 Universal Liquid Module was set to refractive indices of 1.520 for CNT and 1.333 for water. After washing the module, about 1.0 mL of an aqueous CMCNa solution was filled. After performing offset measurement, optical axis adjustment, background measurement under a condition of a pump speed of 50%, the prepared aqueous MWCNT dispersion was added to the particle size distribution meter such that a relative density indicating a percentage of light scattered outside the beam by particles was from 8 to 12%, or PIDS was from 40% to 55%, and ultrasonic irradiation was carried out at 78 W for 2 minutes using a device attached to the particle size distribution meter (pretreatment for measurement), and circulation was carried out for 30 seconds to remove bubbles, and the particle size distribution measurement was then carried out. A graph of volume % relative to a particle size (particle diameter) was created and a median diameter D50 was determined.

The particle size measurement was carried out by collecting three measuring samples while changing collecting positions, for each MWCNT sample, and the median diameter D50 value was calculated as an average value of the three samples.

Each sample used for the measurement is not subjected to any dispersion treatment other than the normalized pretreatment for measurement as described above. As used herein, the "dispersion treatment other than the normalized pretreatment for measurement" refers to any known dispersion treatment that will affect dispersibility, including a manual dispersion treatment using a mortar or the like, a mechanical dispersion treatment such as a jet mill, a bead mill, a ball mill and an emulsification dispersion apparatus, and a dispersion treatment using ultrasonic waves such as an ultrasonic homogenizer and an ultrasonic washing machine other than the above pretreatment for measurement.

The results of the powder characterization for MWCNTs used in Examples and Comparative Examples are shown in Table 2.

TABLE 2

| | Each MWCNT | MWCNT-A (Synthesis Example 1) | MWCNT-B (Synthesis Example 2) | MWCNT-C (Synthesis Example 3) | MWCNT-D (Cracking Treatment) | Flotube 9000 (Commercial Product) | NC 7000 (Commercial Product) | VGCF-H (Commercial Product) |
|---|---|---|---|---|---|---|---|---|
| Powder Characteristics | D/G Value | 0.86 | 1.0 | 1.3 | 1.4 | 1.7 | 1.8 | 0.1 |
| | Powder Resistivity [Ω · cm] | 0.023 | 0.017 | 0.035 | 0.036 | 0.023 | 0.025 | 0.016 |
| | Median Diameter D50 Value | 0.5 | 3.0 | 8.0 | 0.2 | 43 | 10 | 0.4 |

Example 1

(Preparation of Positive Electrode Slurry for Non-Aqueous Batteries Containing Conductive Composition for Electrodes)

Methylpyrrolidone (available from KANTO KAGAKU, hereinafter referred to as NMP) as a solvent, $LiCoO_2$ ("KD 20" available from Umicore; an average primary particle diameter of 20 µm) as a positive electrode active material, polyvinylidene fluoride ("KF Polymer 7208" available from KUREHA CORPORATION; hereinafter referred to as "PVdF") as a binder, polyvinylpyrrolidone ("PVP K-90" available from DAIICHI KOGYO Co., Ltd.; hereinafter referred to as "PVP") as a dispersant, and CB ("FX-35" available from DENKA COMPANY LIMITED) and MWCNT-A synthesized in the above Synthesis Example 1 as a conductive material were prepared. They were weighed and mixed such that a solid content of PVdF was 1.00% by mass, a solid content of PVP was 0.05% by mass, a solid content of CB was 0.485% by mass, and a solid content of MWCNT-A was 0.015% by mass (a content of MWCNTs in the conductive material was 3% by mass), and NMP was added to this mixture and mixed using a rotation/revolution type mixer (THINKY MIXER ARV-310 available from THINKY CORPORATION) until a homogenized mixture was obtained. Further, $LiCoO_2$ powder was weighed such that a solid content of the powder was 98.45% by mass, and added to the above mixture, and mixed using the rotation/revolution type mixer (THINKY MIXER ARV-310 available from THINKY CORPORATION) until a homogenized mixture was obtained, to prepare a positive electrode slurry for non-aqueous batteries, containing the conductive composition for electrodes.

(Production of Positive Electrode for Non-Aqueous Batteries)

Then, the positive electrode slurry for non-aqueous batteries, containing each conductive composition for electrodes prepared, was applied onto an aluminum foil (available from UACJ) having a thickness of 15 µm with an applicator to form a film, and allowed to stand in a dryer to carry out preliminary drying at 80° C. for 10 minutes and further at 105° C. for 1 hour. It was then pressed with a roll press machine under a linear pressure of 200 kg/cm to prepare a film such that a thickness of the film including the aluminum foil having the thickness of 15 µm was 60 µm. To remove volatile components, vacuum drying was performed at 170° C. for 3 hours to obtain a positive electrode for non-aqueous batteries.

(Evaluation of Positive Electrode for Non-Aqueous Batteries)

[Binding Property of Positive Electrode for Non-Aqueous Batteries]

The produced positive electrode for non-aqueous batteries was cut into a strip having 1.5 cm, and a pressure-sensitive adhesive tape for peeling was attached to the front side and a double-sided pressure-sensitive adhesive tape for sample fixing was attached to the back side, respectively. The strip was fixed to a fixing plate made of SUS, and 180° peel strength was measured in accordance with JIS Z 0237 using a tensile/compression universal testing machine (Small-sized Desktop Machine EZ-S available from Shimadzu Corporation). The obtained peel strength was regarded as the binding property. The binding property of the positive electrode for non-aqueous batteries according to Example 1 was 12 N/m.

[Pole Plate Resistance of Positive Electrode for Non-Aqueous Batteries]

The produced positive electrode for non-aqueous batteries was cut out into a disk shape having a diameter of 14 mm, and the front and back surfaces of the disk were sandwiched by flat plate electrodes made of SUS 304. In this state, using an electrochemical measurement system (Function Generator 1260 and Potentio-galvanostat 1287, available from Solartron Co., Ltd.), an AC impedance was measured at an amplitude voltage of 10 mV and a frequency range of from 1 Hz to 100 kHz. A resistance value obtained by multiplying the obtained resistance component value by the disk-shaped area cut out was determined to be the pole plate resistance. The pole plate resistance of the positive electrode for non-aqueous batteries according to Example 1 was 160 $\Omega \cdot cm^2$.

(Production of Negative Electrode for Non-Aqueous Batteries)

Pure water (available from Kanto Kagaku) as a solvent, artificial graphite ("MAG-D" available from Hitachi Chemical Co., Ltd.) as a negative electrode active material, styrene butadiene rubber ("BM-400B" available from Zeon Corporation, hereinafter referred to as SBR) as a binder, carboxymethyl cellulose ("D2200" available from Daicel Corporation, hereinafter referred to as CMC) as a dispersant were prepared. They were then weighted and mixed such that a solid content of CMC was 1.00% by mass, a solid content of artificial graphite was 97% by mass, and pure water was added to this mixture and mixed using a rotation/revolution type mixer (THINKY MIXER ARV-310 available from THINKY CORPORATION) until a homogenized mixture was obtained. Further, SRB was weighed such that a solid content of SRB was 2% by mass, and added to the above mixture, and mixed using the rotation/revolution type mixer (THINKY MIXER ARV-310 available from THINKY CORPORATION) until a homogenized mixture was obtained, to prepare a negative electrode slurry for non-aqueous batteries. The negative electrode slurry for non-aqueous batteries was applied onto a copper foil (available from UACJ) having a thickness of 10 µm with an applicator to form a film, and allowed to stand in a dryer to carry out preliminary drying at 60° C. for 1 hour. It was then pressed with a roll press machine under a linear pressure of 100 kg/cm to prepare a film such that a thickness of the film including the copper foil was 40 µm. To remove volatile components, vacuum drying was performed at 120° C. for 3 hours to obtain a negative electrode for non-aqueous batteries.

(Production of Non-Aqueous Battery)

The positive electrode for non-aqueous batteries was processed into 40×40 mm in a dry room controlled to have a dew point of −50° C. or less, the negative electrode for non-aqueous batteries was processed into 44×44 mm, and they were then arranged such that their electrode mixture coated surfaces faced at the center and a polyolefin microporous membrane processed into 45×45 mm was then placed between the electrodes. An aluminum laminate sheet cut and processed into 70×140 mm square was folded in half at the center part of the long side, and sandwiched by arranging it such that collecting tabs of the electrodes were exposed to the outside of the laminate sheet. A heat-sealer was used to heat-weld two sides including the side of the aluminum laminate sheet where the collecting tabs were exposed, and 2 g of an electrolytic solution (available from Kishida Chemical Co., Ltd; ethylene carbonate/diethyl carbonate=3/7 (volume ratio)+1 M $LiPF_6$ solution; hereinafter referred to as electrolytic solution) was poured from one side which was not heat-welded, and sufficiently penetrated into the positive electrode for non-aqueous batteries, the negative electrode for non-aqueous batteries and the microporous polyolefin membrane. Subsequently, the remaining one side of the aluminum laminate sheet was heat-welded with a vacuum heat sealer while depressurizing the interior of a battery to obtain a non-aqueous battery.

The produced non-aqueous battery was evaluated for battery performance by the following method.

(Evaluation of Non-Aqueous Battery)

[Discharge Rate Characteristic (Capacity Retention During 3 C Discharge)]

The produced non-aqueous battery was charged at a limited constant current and constant voltage of 4.2 V, 0.2 C at 25° C., and then discharged up to 3.0 V at a constant current of 0.2 C. Subsequently, the discharge current was changed to 0.2 C, 0.5 C, 1 C, 2 C and 3 C, and a discharge capacity relative to each discharge current was measured. For recovery charge in each measurement, a limited constant current and constant voltage charge of 4.2 V, 0.2 C was performed. The capacity retention during 3 C discharge relative to 0.2 C discharge was then calculated. The capacity retention of the battery of the Example during 3 C discharge was 79.4%.

[Cycle Characteristic (Discharge Capacity Retention after Cycle)]

The produced non-aqueous battery was charged at a limited constant current and constant voltage of 4.2 V, 1 C at 25° C. and then discharged up to 3.0 V at a constant current of 1 C. Subsequently, 400 cycles of the above charge and discharge was repeated to measure the discharge capacity. The discharge capacity retention after cycle at the time of the 400 cycle discharge relative to one cycle discharge was then calculated. The discharge capacity retention after cycle for the battery of Example 1 was 81.5%.

Example 2

A positive electrode slurry for non-aqueous batteries containing a conductive composition for electrodes, a positive electrode for non-aqueous batteries and a non-aqueous battery were prepared and each evaluation was carried out in the same methods as those of Example 1, with the exception that the prepared materials were weighed and mixed such that a solid content of CB was 0.425% by mass, and a solid content of MWCNT-A was 0.075% by mass (a content of MWCNTs in the conductive material was 15% by mass). The results are shown Table 3.

Example 3

A positive electrode slurry for non-aqueous batteries containing a conductive composition for electrodes, a positive electrode for non-aqueous batteries and a non-aqueous battery were prepared and each evaluation was carried out in the same methods as those of Example 1, with the exception that the prepared materials were weighed and mixed such that a solid content of CB was 0.25% by mass, and a solid content of MWCNT-A was 0.25% by mass (a content of MWCNTs in the conductive material was 50% by mass). The results are shown Table 3.

Example 4

A positive electrode slurry for non-aqueous batteries containing a conductive composition for electrodes, a positive electrode for non-aqueous batteries and a non-aqueous battery were prepared and each evaluation was carried out in the same methods as those of Example 1, with the exception that CB in the conductive material was SB50 L (available from Denka Company Limited). The results are shown Table 3.

Example 5

A positive electrode slurry for non-aqueous batteries containing a conductive composition for electrodes, a positive electrode for non-aqueous batteries and a non-aqueous battery were prepared and each evaluation was carried out in the same methods as those of Example 3, with the exception that CB in the conductive material was SB50L (available from Denka Company Limited). The results are shown Table 3.

Example 6

A positive electrode slurry for non-aqueous batteries containing a conductive composition for electrodes, a positive electrode for non-aqueous batteries and a non-aqueous battery were prepared and each evaluation was carried out in the same methods as those of Example 1, with the exception that CB in the conductive material was SAB (available from Denka Company Limited). The results are shown Table 3.

Example 7

A positive electrode slurry for non-aqueous batteries containing a conductive composition for electrodes, a positive electrode for non-aqueous batteries and a non-aqueous battery were prepared and each evaluation was carried out in the same methods as those of Example 3, with the exception that CB in the conductive material was SAB (available from Denka Company Limited). The results are shown Table 3.

Example 8

A positive electrode slurry for non-aqueous batteries containing a conductive composition for electrodes, a positive electrode for non-aqueous batteries and a non-aqueous battery were prepared and each evaluation was carried out in the same methods as those of Example 1, with the exception that MWCNT in the conductive material was MWCNT-B synthesized in Synthesis Example 2. The results are shown Table 4.

Example 9

A positive electrode slurry for non-aqueous batteries containing a conductive composition for electrodes, a positive electrode for non-aqueous batteries and a non-aqueous battery were prepared and each evaluation was carried out in the same methods as those of Example 3, with the exception that MWCNT in the conductive material was MWCNT-B synthesized in Synthesis Example 2. The results are shown Table 4.

Example 10

A positive electrode slurry for non-aqueous batteries containing a conductive composition for electrodes, a positive electrode for non-aqueous batteries and a non-aqueous battery were prepared and each evaluation was carried out in the same methods as those of Example 1, with the exception that MWCNT in the conductive material was MWCNT-C synthesized in Synthesis Example 3. The results are shown Table 4.

Example 11

A positive electrode slurry for non-aqueous batteries containing a conductive composition for electrodes, a positive electrode for non-aqueous batteries and a non-aqueous battery were prepared and each evaluation was carried out in the same methods as those of Example 3, with the exception that MWCNT in the conductive material was MWCNT-C synthesized in Synthesis Example 3. The results are shown Table 4.

Example 12

A positive electrode slurry for non-aqueous batteries containing a conductive composition for electrodes, a positive electrode for non-aqueous batteries and a non-aqueous battery were prepared and each evaluation was carried out in the same methods as those of Example 3, with the exception that CB in the conductive material was SB50L (available from Denka Company Limited) and MWCNT in the conductive material was MWCNT-B synthesized in Synthesis Example 2. The results are shown Table 4.

Example 13

A positive electrode slurry for non-aqueous batteries containing a conductive composition for electrodes, a positive electrode for non-aqueous batteries and a non-aqueous battery were prepared and each evaluation was carried out in the same methods as those of Example 3, with the exception that CB in the conductive material was SB50L (available from Denka Company Limited) and MWCNT in the conductive material was MWCNT-C synthesized in Synthesis Example 3. The results are shown Table 4.

Example 14

A positive electrode slurry for non-aqueous batteries containing a conductive composition for electrodes, a positive electrode for non-aqueous batteries and a non-aqueous battery were prepared and each evaluation was carried out in the same methods as those of Example 1, with the exception that CB in the conductive material was SAB (available from Denka Company Limited) and MWCNT in the conductive material was MWCNT-B synthesized in Synthesis Example 2. The results are shown Table 4.

Example 15

A positive electrode slurry for non-aqueous batteries containing a conductive composition for electrodes, a positive electrode for non-aqueous batteries and a non-aqueous battery were prepared and each evaluation was carried out in the same methods as those of Example 1, with the exception that CB in the conductive material was SAB (available from Denka Company Limited) and MWCNT in the conductive material was MWCNT-C synthesized in Synthesis Example 3. The results are shown Table 4.

Example 16

A positive electrode slurry for non-aqueous batteries containing a conductive composition for electrodes, a positive electrode for non-aqueous batteries and a non-aqueous battery were prepared and each evaluation was carried out in the same methods as those of Example 3, with the exception that CB in the conductive material was HS-100 (available from Denka Company Limited). The results are shown Table 4.

Example 17

A positive electrode slurry for non-aqueous batteries containing a conductive composition for electrodes, a positive electrode for non-aqueous batteries and a non-aqueous battery were prepared and each evaluation was carried out in the same methods as those of Example 3, with the exception that MWCNT in the conductive material was VGCF-H (available from Showa Denko K.K.). The results are shown Table 4.

Comparative Example 1

A positive electrode slurry for non-aqueous batteries containing a conductive composition for electrodes, a positive electrode for non-aqueous batteries and a non-aqueous battery were prepared and each evaluation was carried out in the same methods as those of Example 1, with the exception that the prepared materials were weighed and mixed such that a solid content of MWCNT-A was 0.5 parts by mass (a content of MWCNTs in the conductive material was 100% by mass). The results are shown Table 5.

Comparative Example 2

A positive electrode slurry for non-aqueous batteries containing a conductive composition for electrodes, a positive electrode for non-aqueous batteries and a non-aqueous battery were prepared and each evaluation was carried out in the same methods as those of Comparative Example 1, with the exception that MWCNT in the conductive material was MWCNT-B synthesized in Synthesis Example 2. The results are shown Table 5.

Comparative Example 3

A positive electrode slurry for non-aqueous batteries containing a conductive composition for electrodes, a positive electrode for non-aqueous batteries and a non-aqueous battery were prepared and each evaluation was carried out in the same methods as those of Comparative Example 1, with the exception that MWCNT in the conductive material was MWCNT-C synthesized in Synthesis Example 3. The results are shown Table 5.

Comparative Example 4

A positive electrode slurry for non-aqueous batteries containing a conductive composition for electrodes, a positive electrode for non-aqueous batteries and a non-aqueous battery were prepared and each evaluation was carried out in the same methods as those of Example 1, with the exception that the prepared materials were weighed and mixed such that a solid content of CB was 0.5% by mass (a content of MWCNTs in the conductive material was 0% by mass). The results are shown Table 5.

Comparative Example 5

A positive electrode slurry for non-aqueous batteries containing a conductive composition for electrodes, a positive electrode for non-aqueous batteries and a non-aqueous battery were prepared and each evaluation was carried out in the same methods as those of Comparative Example 4, with the exception that CB in the conductive material was SB50L (available from Denka Company Limited). The results are shown Table 5.

Comparative Example 6

A positive electrode slurry for non-aqueous batteries containing a conductive composition for electrodes, a positive electrode for non-aqueous batteries and a non-aqueous battery were prepared and each evaluation was carried out in the same methods as those of Comparative Example 4, with the exception that CB in the conductive material was SAB (available from Denka Company Limited). The results are shown Table 5.

Comparative Example 7

A positive electrode slurry for non-aqueous batteries containing a conductive composition for electrodes, a positive electrode for non-aqueous batteries and a non-aqueous battery were prepared and each evaluation was carried out in the same methods as those of Comparative Example 1, with the exception that MWCNT in the conductive material was Flotube 9000 (available from CNano Technology Limited). The results are shown Table 5.

Comparative Example 8

A positive electrode slurry for non-aqueous batteries containing a conductive composition for electrodes, a positive electrode for non-aqueous batteries and a non-aqueous battery were prepared and each evaluation was carried out in the same methods as those of Example 1, with the exception that the conductive materials were weighted and mixed such that a solid content of CB was 0.2% by mass, and a solid content of MWCNT-A was 0.3% by mass (a content of MWCNTs in the conductive material was 60% by mass). The results are shown Table 6.

Comparative Example 9

A positive electrode slurry for non-aqueous batteries containing a conductive composition for electrodes, a positive electrode for non-aqueous batteries and a non-aqueous battery were prepared and each evaluation was carried out in the same methods as those of Example 1, with the exception that the conductive materials were weighted and mixed such that a solid content of CB was 0.075% by mass, and a solid content of MWCNT-A was 0.425% by mass (a content of MWCNTs in the conductive material was 85% by mass). The results are shown Table 6.

Comparative Example 10

A positive electrode slurry for non-aqueous batteries containing a conductive composition for electrodes, a positive electrode for non-aqueous batteries and a non-aqueous battery were prepared and each evaluation was carried out in the same methods as those of Example 1, with the exception that MWCNT in the conductive material was Flotube 9000 (available from CNano Technology Limited), and the conductive materials were weighted and mixed such that a solid content of CB was 0.45% by mass, and a solid content of Flotube 9000 was 0.05% by mass (a content of MWCNTs in the conductive material was 10% by mass). The results are shown Table 6.

Comparative Example 11

A positive electrode slurry for non-aqueous batteries containing a conductive composition for electrodes, a positive electrode for non-aqueous batteries and a non-aqueous battery were prepared and each evaluation was carried out in the same methods as those of Example 3, with the exception that MWCNT in the conductive material was Flotube 9000 (available from CNano Technology Limited). The results are shown Table 6.

Comparative Example 12

A positive electrode slurry for non-aqueous batteries containing a conductive composition for electrodes, a positive electrode for non-aqueous batteries and a non-aqueous battery were prepared and each evaluation was carried out in the same methods as those of Comparative Example 9, with the exception that MWCNT in the conductive material was Flotube 9000 (available from CNano Technology Limited). The results are shown Table 6.

Comparative Example 13

A positive electrode slurry for non-aqueous batteries containing a conductive composition for electrodes, a positive electrode for non-aqueous batteries and a non-aqueous battery were prepared and each evaluation was carried out in the same methods as those of Comparative Example 10, with the exception that MWCNT in the conductive material was NC 7000 (available from Nanocyl SA). The results are shown Table 6.

Comparative Example 14

A positive electrode slurry for non-aqueous batteries containing a conductive composition for electrodes, a positive electrode for non-aqueous batteries and a non-aqueous battery were prepared and each evaluation was carried out in the same methods as those of Comparative Example 10, with the exception that MWCNT in the conductive material was MWCNT-D obtained by the above cracking treatment. The results are shown Table 6.

TABLE 3

| | | Example 1 | Example 2 | Example 3 | Example 4 | Example 5 | Example 6 | Example 7 |
|---|---|---|---|---|---|---|---|---|
| Conductive Material Type | MWCNT | MWCNT-A | MWCNT-A | MWCNT-A | MWCNT-A | MWCNT-A | MWCNT-A | MWCNT-4 |
| | CB | FX-35 | FX-35 | FX-35 | SB50L | SB50L | SAB | SAB |
| Conductive Material Content [% by mass] | | 0.5 | 0.5 | 0.5 | 0.5 | 0.5 | 0.5 | 0.5 |
| MWCNT Content in Conductive Material [% by mass] | | 3 | 15 | 50 | 3 | 50 | 3 | 50 |

TABLE 3-continued

|  |  | Example 1 | Example 2 | Example 3 | Example 4 | Example 5 | Example 6 | Example 7 |
|---|---|---|---|---|---|---|---|---|
| Electrode Evaluation | Binding Property [N/m] | 13 | 12 | 16 | 18 | 21 | 12 | 14 |
|  | Pole Plate Resistance [$\Omega \cdot cm^2$] | 160 | 115 | 580 | 570 | 480 | 144 | 554 |
| Battery Evaluation | Capacity Retention during 3C Discharge [%] | 79.4 | 80.1 | 74.5 | 72.4 | 75.8 | 80.5 | 76.4 |
|  | Discharge Capacity Retention after Cycle [%] | 81.5 | 84.2 | 74.4 | 74.5 | 76.4 | 82.4 | 77.2 |

TABLE 4

|  |  | Example 8 | Example 9 | Example 10 | Example 11 | Example 12 | Example 13 |
|---|---|---|---|---|---|---|---|
| Conductive Material Type | MWCNT | MWCNT-B | MWCNT-B | MWCNT-C | MWCNT-C | MWCNT-B | MWCNT-C |
|  | CB | FX-35 | FX-35 | FX-35 | FX-35 | SB50L | SB50L |
| Conductive Material Content [% by mass] |  | 0.5 | 0.5 | 0.5 | 0.5 | 0.5 | 0.5 |
| MWCNT Content in Conductive Material [% by mass] |  | 3 | 50 | 3 | 50 | 50 | 50 |
| Electrode Evaluation | Binding Property [N/m] | 13 | 17 | 14 | 18 | 18 | 19 |
|  | Pole Plate Resistance [$\Omega \cdot cm^2$] | 185 | 600 | 240 | 620 | 470 | 510 |
| Battery Evaluation | Capacity Retention during 3C Discharge [%] | 77.4 | 73.4 | 76.8 | 72.8 | 72.5 | 71.8 |
|  | Discharge Capacity Retention after Cycle [%] | 80.2 | 73.6 | 79.8 | 71.5 | 75.6 | 74.6 |

|  |  | Example 14 | Example 15 | Example 16 | Example 17 |
|---|---|---|---|---|---|
| Conductive Material Type | MWCNT | MWCNT-B | MWCNT-C | MWCNT-A | VGCF-H |
|  | CB | SAB | SAB | HS-100 | FX-35 |
| Conductive Material Content [% by mass] |  | 0.5 | 0.5 | 0.5 | 0.5 |
| MWCNT Content in Conductive Material [% by mass] |  | 3 | 3 | 50 | 3 |
| Electrode Evaluation | Binding Property [N/m] | 13 | 14 | 20 | 18 |
|  | Pole Plate Resistance [$\Omega \cdot cm^2$] | 178 | 189 | 630 | 360 |
| Battery Evaluation | Capacity Retention during 3C Discharge [%] | 79.8 | 78.4 | 71.1 | 75.5 |
|  | Discharge Capacity Retention after Cycle [%] | 81.7 | 80.9 | 70.8 | 79.4 |

TABLE 5

|  |  | Comprative Examaple 1 | Comprative Examaple 2 | Comprative Examaple3 | Comprative Examaple 4 | Comprative Examaple 5 | Comprative Examaple 6 | Comprative Examaple 7 |
|---|---|---|---|---|---|---|---|---|
| Conductive Material Type | MWCNT | MWCNT-A | MWCNT-B | MWCNT-C | — | — | — | Flotube 9000 |
|  | CB | — | — | — | FX-35 | SB50L | SAB | — |
| Conductive Material Content [% by mass] |  | 0.5 | 0.5 | 0.5 | 0.5 | 0.5 | 0.5 | 0.5 |
| MWCNT Content in Conductive Material [% by mass] |  | 100 | 100 | 100 | 0 | 0 | 0 | 100 |
| Electrode Evaluation | Binding Property [N/m] | 9 | 9 | 10 | 10 | 12 | 8 | 9 |
|  | Pole Plate Resistance [$\Omega \cdot cm^2$] | 920 | 980 | 1050 | 740 | 940 | 690 | 850 |

TABLE 5-continued

| | | Comprative Examaple 1 | Comprative Examaple 2 | Comprative Examaple 3 | Comprative Examaple 4 | Comprative Examaple 5 | Comprative Examaple 6 | Comprative Examaple 7 |
|---|---|---|---|---|---|---|---|---|
| Battery Evaluation | Capacity Retention during 3C Discharge [%] | 68.4 | 67.4 | 65.8 | 68.2 | 59.8 | 69.8 | 61.5 |
| | Discharge Capacity Retention after Cycle [%] | 64.3 | 63.2 | 62.9 | 67.4 | 60.3 | 69.7 | 61.4 |

TABLE 6

| | | Comprative Examaple 8 | Comprative Examaple 9 | Comprative Examaple 10 | Comprative Examaple 11 | Comprative Examaple 12 | Comprative Examaple 13 | Comprative Examaple 14 |
|---|---|---|---|---|---|---|---|---|
| Conductive Material Type | MWCNT | MWCNT-A | MWCNT-A | Flotube 9000 | Flotube 9000 | Flotube 9000 | NC 7000 | MWCNT-D |
| | CB | FX-35 | FX-35 | FX-35 | FX-35 | FX-35 | FX-35 | FX-35 |
| Conductive Material Content [% by mass] | | 0.5 | 0.5 | 0.5 | 0.5 | 0.5 | 0.5 | 0.5 |
| MWCNT Content in Conductive Material [% by mass] | | 60 | 85 | 10 | 50 | 85 | 10 | 10 |
| Electrode Evaluation | Binding Property [N/m] | 11 | 10 | 11 | 9 | 9 | 8 | 7 |
| | Pole Plate Resistance [$\Omega \cdot cm^2$] | 690 | 820 | 640 | 750 | 830 | 884 | 945 |
| Battery Evaluation | Capacity Retention during 3C Discharge [%] | 67.1 | 65.4 | 66.7 | 65.4 | 64.7 | 59.7 | 62.5 |
| | Discharge Capacity Retention after Cycle [%] | 67.7 | 66.9 | 68.1 | 64.1 | 62.5 | 62.1 | 65.7 |

It was found that each of the positive electrodes for non-aqueous batteries containing the conductive compositions for electrodes according to Examples 1 to 17 had a lower pole plate resistance and higher binding property than those of the positive electrodes for non-aqueous batteries containing the conductive compositions for electrodes according to Comparative Examples 1 to 14. Thus, it was found that each positive electrode for non-aqueous batteries using the conductive compositions for electrodes according to Examples of the present invention could suppress a decrease in voltage drop during discharge.

Furthermore, it was found that each of the non-aqueous batteries according to Examples 1 to 17 had higher discharge rate characteristics and higher cycle characteristics than those of the non-aqueous batteries according to Comparative Examples 1 to 14. Thus, it was found that the non-aqueous battery using the conductive composition for electrodes according the present invention could suppress a decrease in output due to an increase in discharge current and also have a higher lifetime.

DESCRIPTION OF REFERENCE NUMERALS

1 positive electrode for non-aqueous batteries
2 negative electrode for non-aqueous batteries
3 insulating layer (polyolefin microporous membrane)
100 rotary type reactor
103 rotating portion
104 fixed portion
105 gas introduction portion
106 stirring blade
107 reaction portion
108 gas introduction pipe
109 thermocouple introduction tube
110 thermocouple
111 gas exhaust pipe

What is claimed is:

1. A conductive composition for electrodes, comprising: a conductive material containing carbon black and multi-walled carbon nanotubes; an active material; a binder; and a dispersant, wherein the multi-walled carbon nanotubes satisfy the following conditions (1) to (3):
   (1) a powder resistivity of 0.035 $\Omega \cdot cm$ or less, as measured under a load of 9.8 MPa;
   (2) a volume-converted median diameter D50 value of from 0.3 to 8 μm, as measured in accordance with JIS Z 8825; and
   (3) a content of from 3 to 50% by mass in the conductive material, and
   wherein the conductive composition for electrodes has a binding property such that an electrode comprising the conductive composition on an aluminum foil current collector has a peel strength of 12 N/m or more as measured in accordance with JIS Z 0237.

2. The conductive composition for electrodes according to claim 1, wherein the carbon black has a number-average primary particle diameter of from 20 to 40 nm and a DBP oil absorption amount of from 200 to 320 ml/100 g as measured in accordance with HS K 6217-4.

3. The conductive composition for electrodes according to claim 1, wherein each of the multi-walled carbon nanotubes has a D/G value of from 0.8 to 1.3 according to Raman spectroscopic measurement.

4. The conductive composition for electrodes according to claim 1, wherein the carbon black is acetylene black.

5. The conductive composition for electrodes according to claim 1, wherein a content of the conductive material is from 0.1 to 2% by mass relative to the total amount of the conductive composition for electrodes.

6. The conductive composition for electrodes according to claim 1, wherein the active material is at least one selected from $LiCoO_2$, $LiMn_2O_4$, $LiNiO_2$, $LiMPO_4$, $Li_2MSiO_4$, $LiNi_xMn_{(2-X)}O_4$, $Li(Mn_XNiYCo_Z)O_2$, $Li(Al_XNi_YCo_Z)O_2$ and $RLi_2MnO_3$-$(1-R)LiMO_2$, in which X in the $LiNi_xMn_{(2-X)}O_4$ satisfies a relationship: $0<X<2$; X, Y and Z in $Li(Mn_XNiYCo_Z)O_2$ or $Li(Al_XNi_YCo_Z)O_2$ satisfy relationships: $X+Y+Z=1$, and $0<X<1$, $0<Y<1$, and $0<Z<1$; and R in $RLi_2MnO_3$-$(1-R)LiMO_2$ satisfies a relationship: $0<R<1$; and M in $LiMPO_4$, $Li_2MSiO_4$ or $RLi_2MnO_3$-$(1-R)LiMO_2$ is at least one element selected from Fe, Co, Ni and Mn.

7. The conductive composition for electrodes according to claim 1, wherein the dispersant is at least one of polyvinyl pyrrolidone and copolymers comprising polyvinyl pyrrolidone.

8. A positive electrode for non-aqueous batteries comprising the conductive composition for electrodes according to claim 1.

9. The positive electrode for non-aqueous batteries according to claim 8, wherein each of the conductive composition for electrodes and an aluminum foil current collector has a peel strength of 12 N/m or more as measured in accordance with JIS Z 0237.

10. A non-aqueous battery comprising the positive electrode for non-aqueous batteries according to claim 8.

* * * * *